July 26, 1932.  C. E. JOHNSON  1,868,533
MOTOR CONSTRUCTION
Filed July 1, 1929   2 Sheets-Sheet 1
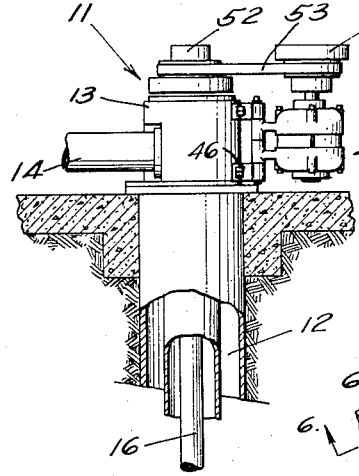
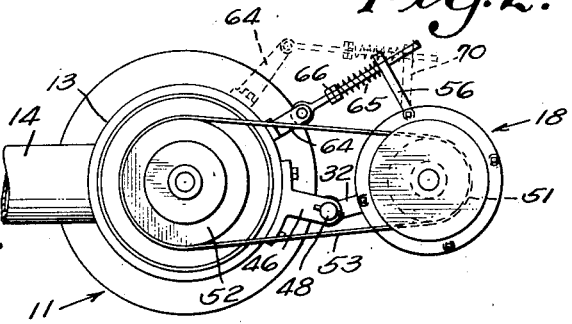
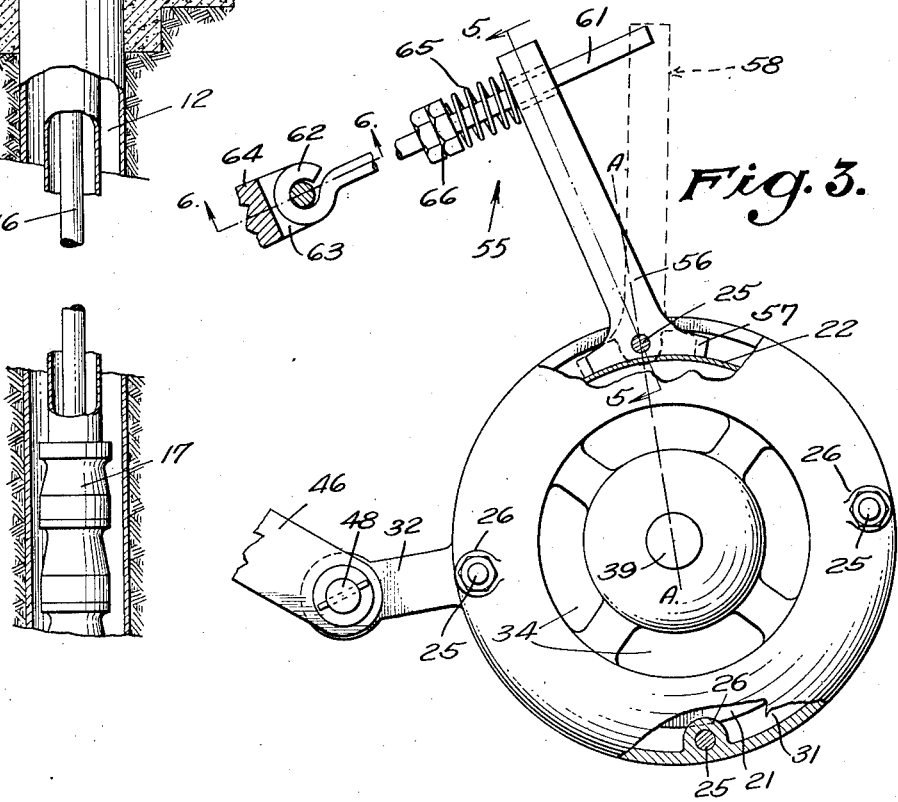
INVENTOR:
Carl E. Johnson,
BY
ATTORNEY.

July 26, 1932.    C. E. JOHNSON    1,868,533
MOTOR CONSTRUCTION
Filed July 1, 1929    2 Sheets-Sheet 2
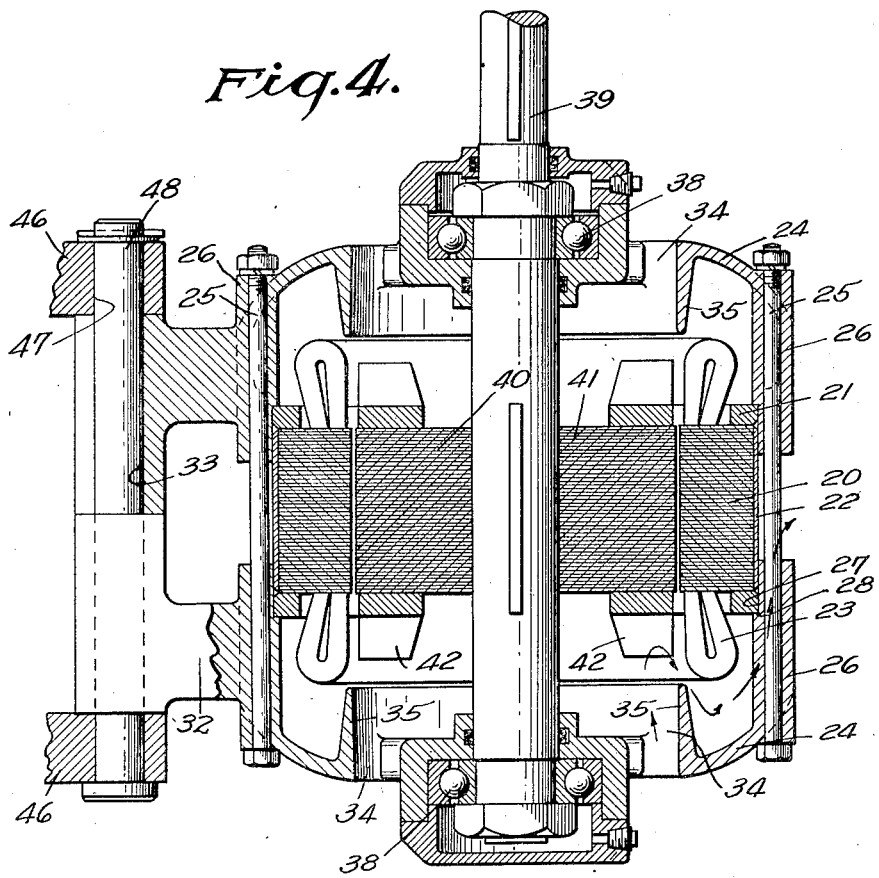
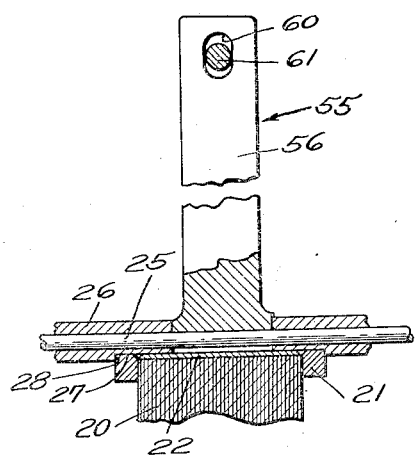
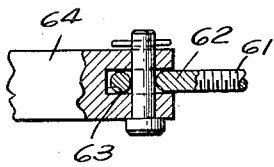
INVENTOR:
Carl E. Johnson,
BY
ATTORNEY.

Patented July 26, 1932

1,868,533

UNITED STATES PATENT OFFICE

CARL E. JOHNSON, OF PASADENA, CALIFORNIA

MOTOR CONSTRUCTION

Application filed July 1, 1929. Serial No. 375,143.

My invention relates to a novel electric motor construction which permits the motor to be used with the short-belt drive to a centrifugal pump.

At present centrifugal pumps of the vertical type are driven in two ways; the first way consists in a belt driving the pump from a vertical motor, and the second consists in directly connecting the pump to a vertical motor. In the first type of drive it is customary to use a long belt and position the motor and pump at a considerable distance apart, so as to provide the belt with sufficient weight to maintain it tightly against the pulleys. Where a variable speed on the pump is desired a belt drive permits of obtaining the speed variation without requiring an expensive variable speed motor, as the pulleys may be changed to provide various ratios of drive between the motor and the pump. However, a long belt drive is undesirable due to the space occupied and the cost of a long belt. The second method overcomes the undesirable features of the first drive but requires a variable speed motor where the pump is to be driven at varying speeds. Where the motor is to be used on power supplies of low frequency, such as twenty-five cycles, the maximum motor speed obtainable is 1500 R. P. M. This prohibits the use of a direct drive where the pump must be driven at a speed higher than 1500 R. P. M. in order to obtain the required output therefrom.

It is an object of my invention to provide a novel construction for an electric motor which permits of a short-belt drive, the drive being particularly adapted as a drive for a centrifugal pump.

It is necessary when using a short-belt drive to have a means for keeping the belt tight in order to provide sufficient friction force between the belt and the pulleys.

It is another object of my invention to provide an electric motor of the above class which may be pivotally supported from a pump head so that a belt of the short-belt drive may be tightened by pivoting the motor on its support.

It is a further object of my invention to provide a novel belt tightener comprising a means for pivoting a motor of the above class so as to keep the belt tight.

It is also an object of my invention to provide a motor of the above type with a stepped pulley which is drivably connected to a similar pulley on the pump head, so as to provide a plurality of speeds for the pump.

It is also an object of my invention to provide a novel method of attaching a belt tightener to a motor of the above type.

Further objects of my invention reside in the details of construction.

In the accompanying drawings in which I have shown a preferred form of my invention:

Fig. 1 is an elevational view of a pump and a motor showing the utility of my invention.

Fig. 2 is a view from above the apparatus shown in Fig. 1.

Fig. 3 is an enlarged view of a belt tightener device of my invention.

Fig. 4 is a sectional view of a motor of my invention showing the construction thereof.

Fig. 5 is a partial sectional view taken on the line 5—5 of Fig. 3.

Fig. 6 is a partial sectional view taken on the line 6—6 of Fig. 3.

Fig. 1 shows my device applied to a centrifugal pump 11 of the vertical type. The pump 11 is positioned at the surface of the ground above a well 12 and has a pump head 13 which is provided with a discharge pipe 14 for discharging a fluid, such as water, from the well 12. Journalled by the pump head 13 and extending downward into the well is a pump shaft 16, to the lower end of which are attached pump impellers in a pump bowl 17. Drivably connected to the pump 11 is a vertical motor 18, the details of which are clearly shown in Fig. 4.

The motor 18 consists of a plurality of stator laminations which are stacked to form a stator frame 20. On opposite sides of the stator frame 20 are perimetric rings 21, and extending around the periphery of the stator frame 20 is a cylindrical member 22 which is welded or otherwise secured to the rings 21 to form a securing means for holding the laminations together. In slots in the stator frame 20 are wound stator windings 23 of the proper characteristics to give the required speed and horse-power to the motor. On opposite sides of the stator frame 20 are end shields 24 which are clamped against the rings 21 by bolts or rod members 25 extending through openings in cylindrical bosses 26 in the end shields 24. As clearly shown in detail in Fig. 5, counterbores 27 in the end shields 24 provide shoulders 28 on the bosses 26, which shoulders 28 engage the rings 21.

As shown in Fig. 3, the spaces between adjacent bosses 26 are of larger diameter than the rings 21 and form ventilating spaces 31 between the stator and the end shields 24. Secured to one side of the end shields 24 are pivoting legs 32 which are provided with openings 33 longitudinally aligned with the motor 18. As shown in Fig. 3 ventilating openings 34 are formed in the ends of the end shields so as to permit air to enter into the interior of the motor. Formed on the end shields 24 radially farther from the center of the motor than the openings 34 are cylindrical members 35 which extend inside the motor and form an air deflector for air entering the motor through the openings 34.

In the center of the ends of the end shields 24 are bearings 38 which are of the sealed lubricant type, in which lubricant is prevented from escaping when the motor is used in a vertical position. Journalled by the bearings 38 is a drive shaft 39 which supports a rotor 40. The rotor consists of rotor laminations 41 which are secured together by suitable means and are rigidly keyed to the shaft 39. Secured in slots in the rotor laminations 41 are rotor windings (not shown). Formed around the periphery of the rotor 40 and extending longitudinally of the motor 18 are ventilating fans 42, which draw air into the motor through the ventilating openings 34 as the rotor is rotated, and direct the air around the air deflectors 35, the windings 23 and out through the spaces 31 between the end shields 24 and the rings 21. The motor is operated in the usual way by supplying power of the proper characteristics to the stator windings 23, which causes the rotor 40 to rotate in a well-known manner.

As shown in Fig. 1 the pump head 13 is supplied with horizontal supporting arms 46 which are provided with vertically aligned openings 47. Rotatably supported in the openings 47 is a pivot pin 48 which also passes through the openings 33 in the pivoting legs 32 secured to the motor 18, so as to pivotally support the motor 18 on the pump head 13. For driving the pump 11 by the motor 18, I provide a belted drive means which consists of a stepped pulley 51 which is secured to the motor shaft with the largest pulley at the top, a stepped pulley 52 on the pump shaft 16 with the smaller pulley on the top, and a belt 53 which extends around the pulleys 51 and 52 and drivably connects the motor shaft 39 to the pump shaft 16.

I prefer to provide the belt 53 of such length that it is not possible to pivot the motor 18 about the pivot pin 48 so as to align the centers of the motor shaft 39, the pivot pin 48 and the pump shaft 16 due to the shortness of the belt 53. This means that a line joining the center of the motor shaft 39 and the center of the pivot pin 48 is formed at an angle to a line joining the center of the pivot pin 48 and the center of the pump shaft 16. This is clearly shown in Fig. 2 and it will be noted that by pivoting the motor 18 about the pivot pin 48 the motor shaft 39 is moved further from the pump shaft 16 and the belt 53 is tightened. In order to provide a means for holding the belt in a tightened position I provide a belt tightener 55 which consists of an arm 56 which may be secured to any of the attaching bolts 25 on the motor 18.

The arm 56 is provided with a shoe portion 57 which contacts the outside of the cylindrical member 22 and inclines the arm 56 at an angle to a radial line A—A extending through the center of the shaft 39 and the center of the bolt 25 by which the arm 56 is secured to the motor 18. It should be noted that the arm 56 may be secured to any of the bolts 25 and may be reversed so as to occupy a position shown by the dotted lines 58 in Fig. 3. As best shown in Fig. 5 the outer free end of the arm 56 is provided with a slotted opening 60 through which slidably extends a guide member 61. An end of the guide member 61 is formed into an eye 62 which is rotatably supported in a slotted opening 63 formed on a bracket 64 secured to the pump head 13. On the guide member 61 is a spring 65, the ends of which engage the arm 56, and adjusting nuts 66, threadedly secured on the guide member 61. The spring 65 is normally maintained in compression when the arm 56 is secured to the motor 18, as shown in Fig. 2. The spring 65 thus tends to pivot the motor 18 in a clockwise direction, as shown in Fig. 2, which tightens the belt 53 on the pulleys 51 and 52.

In the operation of the drive shown in Fig. 1, power is supplied to the motor 18 which causes the rotor 40 and shaft 39 to rotate. The belt 53 is extended around the proper pulleys of the stepped pulleys 51 and 52 so as to drive the pump 11 at the required speed. The belt 53 is maintained sufficiently tight to provide the necessary friction force between the belt 53 and the pulleys 51 and 52 by the action of the spring 65 of the belt tightener device 55 acting on the arm 56, which normally tends to pivot the motor and tighten the belt 53, as explained before.

A belt drive of my invention, as explained above in connection with the centrifugal pump, is also applicable to other equipment, as the design of the arm 56 permits the arm to be attached at various points about the motor 18 and permits it to be secured at various angles thereto. This permits the motor 18 to be adapted to other types of machines in which it may not be desirable or practical to position the guide member 61, as shown in Fig. 3. In order to better explain this I have shown, by dotted lines 70 in Fig. 2, the arm 56 as being secured in a reverse position to that occupied in Fig. 3, and the arm 64 extending further from the pump head 13 as is necessary in order to position the guide member 61 at the correct angle.

It should be noted that the use of a short-belt drive on a centrifugal pump eliminates the long belt now used, and the use of stepped pulleys permits a variation in the pump speed.

It should be understood that although I have illustrated and explained by invention as adapted to a centrifugal pump, I am not confined to this application, as my invention may be used in other ways. Certain other modifications may also be made without departing from the spirit of my invention.

I claim as my invention:

In a motor, the combination of: a plurality of stator laminations stacked so as to form a stator frame; ring members disposed on opposite sides of said stator frame; means for rigidly securing said ring members together; end shields disposed longitudinally outside said ring members; attaching rod members for retaining said end shields in position; a drive shaft on said motor; means for pivotally supporting said motor from said end shields; belted drive means connecting said drive shaft to a driven shaft; a removable arm secured to one of said attaching rod members; and means acting on said arm for pivoting said motor so as to tighten a belt of said belted drive means.

In testimony whereof, I have hereunto set my hand at Los Angeles, California, this 18 day of June 1929.

CARL E. JOHNSON.